(12) United States Patent
Haussmann

(10) Patent No.: US 10,112,476 B2
(45) Date of Patent: Oct. 30, 2018

(54) COOLING MODULE OF A VEHICLE AIR CONDITIONING SYSTEM, AND ASSEMBLY FOR COOLING A MOTOR VEHICLE ENGINE WITH A COOLING MODULE OF THIS TYPE

(71) Applicant: VALEO KLIMASYSTEME GMBH, Bad Rodach (DE)

(72) Inventor: Roland Haussmann, Bad Rodach (DE)

(73) Assignee: VALEO KLIMASYSTEME GMBH, Bad Rodach (DE)

(*) Notice: Subject to any disclaimer, the term of this patent is extended or adjusted under 35 U.S.C. 154(b) by 0 days.

(21) Appl. No.: 15/527,225

(22) PCT Filed: Nov. 18, 2015

(86) PCT No.: PCT/EP2015/076977
§ 371 (c)(1),
(2) Date: May 16, 2017

(87) PCT Pub. No.: WO2016/079187
PCT Pub. Date: May 26, 2016

(65) Prior Publication Data
US 2017/0334283 A1 Nov. 23, 2017

(30) Foreign Application Priority Data
Nov. 20, 2014 (DE) .......................... 10 2014 117 007

(51) Int. Cl.
*B60K 11/04* (2006.01)
*F01P 3/18* (2006.01)
*F01P 5/02* (2006.01)

(52) U.S. Cl.
CPC .............. *B60K 11/04* (2013.01); *F01P 3/18* (2013.01); *F01P 5/02* (2013.01); *F01P 2003/187* (2013.01); *F01P 2005/025* (2013.01)

(58) Field of Classification Search
CPC ......... B60K 11/02; B60K 11/04; B60K 11/08; F01P 5/02; F01P 3/10; F01P 2003/187; F01P 3/18; F01P 2005/025
(Continued)

(56) References Cited

U.S. PATENT DOCUMENTS

| 4,425,766 A * | 1/1984 | Claypole ................. F01P 7/048 |
| | | 123/41.12 |
| 4,938,303 A * | 7/1990 | Schaal ................. B60H 1/3227 |
| | | 123/41.48 |
| 5,878,594 A * | 3/1999 | Lazzaro ................. B60K 11/04 |
| | | 62/474 |
| 9,328,652 B2 * | 5/2016 | Bruss ........................ F01P 3/00 |
| 2016/0001629 A1 * | 1/2016 | Rohr ..................... B60K 11/04 |
| | | 165/76 |

FOREIGN PATENT DOCUMENTS

CN 201 881 882 U 6/2011
DE 38 25 071 C1 10/1989
(Continued)

OTHER PUBLICATIONS

International Search Report issued in PCT/EP2015/076977 dated Mar. 16, 2016 (3 pages).
(Continued)

*Primary Examiner* — John D Walters
(74) *Attorney, Agent, or Firm* — Osha Liang LLP

(57) ABSTRACT

The invention relates to a cooling module (10) of a vehicle air conditioning system in particular for trucks, having a fan (12) which has an air inlet (14) and an air outlet (16) and generates an air flow in an air flow direction (18) from the air inlet (14) to the air outlet (16), a condenser (20) which can be flowed through bidirectionally for liquefying a refrigerant of the vehicle air conditioning system, which condenser (20) has an air flow cross section ($A_1$) and is arranged so as to be adjacent to the air outlet (16) of the fan (12), wherein the air flow cross section ($A_1$) has a first part cross section (22) and a second part cross section (24) which is different from the first part cross section (22), wherein the air outlet (16) of the fan (12) is assigned exclusively to the first
(Continued)

part cross section (22) and loads the latter in the air flow direction (18) with the entire air flow of the fan (12), and wherein the second part cross section (24) can be flowed through during operation of the fan (12) selectively in the air flow direction (18) of the fan (12) and counter to the air flow direction (18) of the fan (12). Furthermore, the invention also relates to an assembly (28) for cooling a motor vehicle engine (30) with a cooling module (10) of this type.

15 Claims, 3 Drawing Sheets

(58) Field of Classification Search
USPC ............................................. 180/68.4, 68.6
See application file for complete search history.

(56) References Cited

FOREIGN PATENT DOCUMENTS

| DE | 10 2014 201991 A1 | 8/2014 |
|---|---|---|
| EP | 0 870 634 A1 | 10/1998 |
| GB | 2 326 626 A | 12/1998 |
| JP | S60-1918 U | 1/1985 |
| JP | 2007-137195 A | 6/2007 |
| KR | 10 2013 0101270 A | 9/2013 |

OTHER PUBLICATIONS

Written Opinion of the International Searching Authority issued in PCT/EP2015/076977 dated Mar. 16, 2016 (8 pages).

* cited by examiner

COOLING MODULE OF A VEHICLE AIR CONDITIONING SYSTEM, AND ASSEMBLY FOR COOLING A MOTOR VEHICLE ENGINE WITH A COOLING MODULE OF THIS TYPE

The invention relates to a cooling module of a vehicle air conditioning unit, in particular for trucks, with a fan which has an air inlet and an air outlet and generates an air flow in an air flow direction from the air inlet to the air outlet, and also a condenser, through which the air flow pass, for liquefying a refrigerant of the vehicle air conditioning unit. Furthermore, the invention also comprises an assembly for cooling a motor vehicle engine, in particular a truck engine, with a radiator ventilator which has a ventilator inlet and ventilator outlet and can generate an air flow in an air flow direction from the ventilator inlet to the ventilator outlet, an engine radiator, through which the air flow can pass, for cooling a coolant for the motor vehicle engine, said engine radiator having an air flow cross section and being arranged adjacent to the ventilator inlet of the radiator ventilator, and a condenser, through which the air flow can pass, for liquefying a refrigerant of the vehicle air conditioning unit.

Such a cooling assembly is disclosed, for example, in KR 10 2013 0101270 A, wherein the condenser of the vehicle air conditioning unit is arranged upstream of the engine radiator. The radiator ventilator is an axial ventilator arranged on the suction side and is customarily driven by the motor vehicle engine.

In KR 10 2013 0101270 A, the cooling assembly forms a pre-assemblable unit, wherein the air flow cross sections of the engine radiator and of the condenser are approximately identical in size. In order to ensure the cooling power required for cooling the motor vehicle engine, for example even in a full load operation of a lorry (for example uphill in the loaded state), the air flow cross section of the engine radiator has to be fairly large. However, a condenser of the vehicle air conditioning unit with a similarly sized air flow cross section is generally over dimensioned and accordingly uneconomical.

In particular, in the case of trucks, to increase the occupant comfort, there are also endeavors to operate the vehicle air conditioning unit even upon parking, i.e. when the motor vehicle engine is switched off.

It is the object of the invention to provide a compact cooling module of a vehicle air conditioning unit and an assembly for cooling a motor vehicle engine with such a cooling module, wherein the cooling module can be operated extremely efficiently in terms of energy even when the motor vehicle engine is switched off, and the assembly provides a sufficient cooling power for cooling the motor vehicle engine even during full load operation.

According to the invention, this object is achieved by a cooling module of a vehicle air conditioning unit, in particular for trucks, with a fan which has an air inlet and an air outlet and generates an air flow in an air flow direction from the air inlet to the air outlet, and also a condenser, through which the air flow can pass bi directionally, for liquefying a refrigerant of the vehicle air conditioning unit, said condenser having an air flow cross section and being arranged adjacent to the air outlet of the fan, wherein the air flow cross section has a first partial cross section and a second partial cross section which is different from the first partial cross section, wherein the air outlet of the fan is exclusively assigned to the first partial cross section and loads the latter in the air flow direction with the entire air flow of the fan, and wherein, during operation of the fan, the flow can pass through the second partial cross section optionally in the air flow direction of the fan and counter to the air flow direction of the fan. In particular when the vehicle is parked, i.e. when the motor vehicle engine is switched off, the second partial cross section of the condenser permits a backflow of the air flow conveyed through the condenser by the fan in the air flow direction via the first partial cross section. Said air flowing back via the second partial cross section of the condenser counter to the air flow direction of the fan can again absorb heat energy from the refrigerant of the vehicle air conditioning unit and therefore contributes to a particularly energy-efficient operation of the cooling module.

Owing to the possibility of the air conveyed through the condenser by the fan in the air flow direction being able to at least partially flow back again via the second partial cross section, the pressure loss of an engine radiator arranged downstream is furthermore also reduced since the air quantity flowing through the radiator in the air flow direction decreases. Owing to the smaller overall pressure loss, a particularly energy-efficient operation of the cooling module is achieved.

According to an embodiment of the cooling module, the fan is a fan which is driven by an electric motor and preferably has a maximum static pressure difference of at most 300 Pa. Within this power range, the energy requirement of the fan is low and the volume flow generated is sufficient for liquefying the refrigerant of the vehicle air conditioning unit. The electric motor used for driving the fan extracts its energy, for example, from a vehicle battery which, owing to the low energy consumption, can ensure a satisfactory operating period of the vehicle air conditioning unit when the motor vehicle is parked.

The condenser preferably has a size $t_K$ in the air flow direction where $t_K \leq 20$ mm, in particular $10\ mm \leq t_K \leq 16$ mm. This small size in the air flow direction leads in an advantageous manner to a particularly low flow resistance and weight of the condenser. When the motor vehicle engine is switched off, the cooling power of such a condenser is limited under some circumstances, but suffices to ensure a satisfactory operation of the vehicle air conditioning unit even when the motor vehicle engine is switched off.

According to a further embodiment of the cooling module, the fan and the condenser are accommodated in a module frame and form a pre-assembled unit with the module frame. The condenser has, for example, refrigerant collecting lines which are fixedly connected to the module frame, in particular are screwed or clamped thereto. The cooling module designed as a pre-assembled unit can be fastened with little outlay to an assembly for cooling a motor vehicle engine and can be exchanged in a simple manner when the need arises.

In this embodiment, the module frame preferably has projections for mounting the cooling module on an engine radiator, wherein the projections extend transversally with respect to the air flow direction.

Furthermore, the module frame can have an air duct in which the fan is fastened, wherein the air duct defines the air inlet and the air outlet of the fan.

According to a preferred embodiment of the cooling module, the module frame is a plastics injection molded part. The module frame can thereby be produced at a reasonable cost and can be changed in its shape in a simple manner. The cooling module can therefore be adapted with a particularly low outlay to different boundary conditions of a certain vehicle series if use is made of fans and condensers which are structurally identical as far as possible and only the shape of module frame varies.

Furthermore, it is preferred that the condenser has a substantially rectangular air flow cross section with a length l and a width b, and the fan has at least one axial ventilator with a diameter D, wherein the following applies: $0.75 \leq D_l/l \leq 1$, in particular $0.85 \leq D_l/l \leq 0.95$, and/or $0.75 \leq D_b/b \leq 1$, in particular $0.85 \leq D_b/b \leq 0.95$, wherein $D_l$ and $D_b$ correspond to the sum of the diameters D of all of the fans which are arranged next to one another in the direction of the l length l or width b of the condenser. In the case of these size ratios, the first partial cross section of the air flow cross section is significantly larger than the second partial cross section, wherein the speed of the air flow flowing back in the second partial cross section is approximately 50% of the speed of the air flow flowing in the first partial cross section in the air flow direction of the fan. Under these conditions, a particularly high cooling power of the cooling module is achieved with little requirement for energy.

The air inlet of the fan can be adjacent, for example, to a radiator grille of the vehicle, in particular can be tightly connected to the radiator grille.

Furthermore, the air outlet of the fan can be adjacent to the condenser and in particular can be tightly connected to the condenser.

The object is furthermore also achieved by an assembly for cooling a motor vehicle engine, in particular a truck engine, with such a cooling module, a radiator ventilator which has a ventilator inlet and a ventilator outlet and generates an air flow in an air flow direction from the ventilator inlet to the ventilator outlet, and also an engine radiator, through which the air flow can pass, for cooling a coolant for the motor vehicle engine, said engine radiator having an air flow cross section and being arranged adjacent to the ventilator inlet of the radiator ventilator, wherein the condenser of the cooling module is arranged upstream of the engine radiator and is adjacent thereto. The suction-side arrangement of the radiator ventilator permits simple and advantageous driving of the radiator ventilator by means of the motor vehicle engine. The radiator ventilator driven by the motor vehicle engine can easily provide a volume flow which ensures a sufficient cooling power of the engine radiator even during full load operation of the motor vehicle. In addition, the condenser is also loaded in the air flow direction via the radiator ventilator and a sufficient volume flow is provided for liquefying the refrigerant of the vehicle air conditioning unit, and therefore the fan or the electric motor for driving the fan can be switched off when the motor vehicle engine is running.

The condenser of the cooling module preferably has a distance d from the engine radiator in the air flow direction, wherein the following applies: $d>6$ mm, in particular $8$ mm$\leq d \leq 20$ mm. This distance suffices in order to distribute the air flow, which is conveyed in the air flow direction through the first partial cross section of the condenser, downstream of the condenser and to permit a back flow counter to the air flow direction via the second partial cross section of the condenser. The resultantly reduced flow resistance of the engine radiator contributes to a particularly energy-efficient operation of the cooling module when the motor vehicle engine is switched off.

According to an embodiment of the assembly for cooling the motor vehicle engine, a mounting element is provided which connects the radiator ventilator to the engine radiator. In particular, the mounting element surrounds the air flow cross section of the engine radiator and tapers in a funnel-shaped manner toward the radiator ventilator such that the radiator ventilator loads the entire air flow cross section on the suction side.

The air flow cross section of the engine radiator preferably has a first partial cross section and a second partial cross section which is different from the first partial cross section, wherein the first partial cross section is covered by the cooling module and the second partial cross section is freely adjacent to a radiator grille of the vehicle. The volume flow sucked up by the radiator ventilator via the first partial cross section is sufficient here to liquefy the refrigerant of the vehicle air conditioning unit in the condenser and to air condition a vehicle interior in a desired manner. At the same time, a certain cooling of the coolant for the motor vehicle engine also takes place via the first partial cross section of the air flow cross section of the engine radiator. Via the second partial cross section of the air flow cross section of the engine radiator, the radiator ventilator sucks up a further volume flow which flows through the engine radiator, but not through the condenser, and therefore constitutes particularly efficient cooling of the coolant for the motor vehicle engine. In this manner, sufficient cooling of the motor vehicle engine can be ensured even during the full load operation of the motor vehicle (for example uphill travel in the loaded state).

The air flow cross section of the engine radiator is preferably at least one and a half times as large, in particular at least twice as large, as the air flow cross section of the condenser. If the air flow cross section of the condenser is selected in such a manner that a satisfactory cooling power of the vehicle air conditioning unit arises both when the motor vehicle engine is running and when the latter is switched off, a sufficient cooling of the motor vehicle engine during the full load operation of the motor vehicle can also be ensured via the indicated ratio of sizes of the air flow cross sections.

Further features and advantages of the invention emerge from the description below of a preferred embodiment with reference to the drawings, in which.

Figure 1:
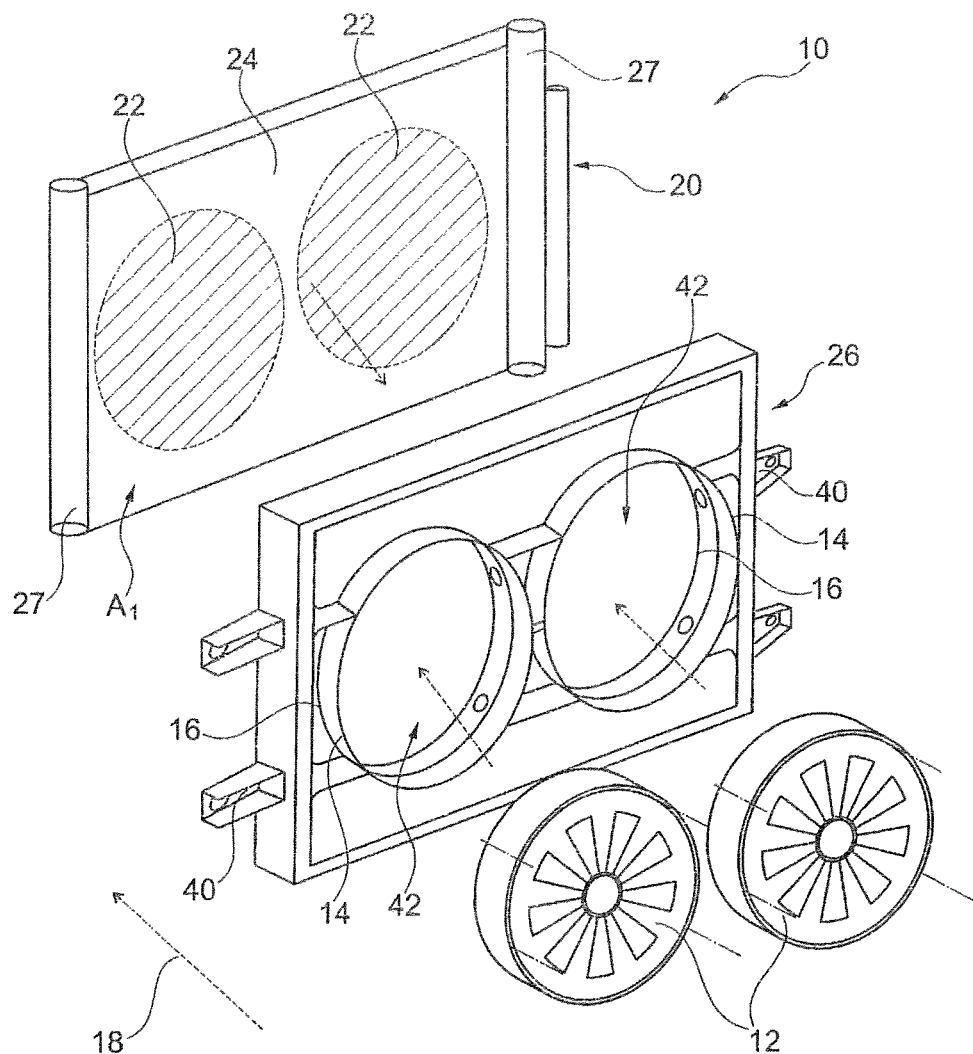
FIG. 1 shows a schematic, perspective, exploded view of a cooling module according to the invention.

FIG. 1 shows a cooling module 10 of a vehicle air conditioning unit, in particular for trucks, with a fan 12 which has an air inlet 14 and an air outlet 16 and generates an air flow in an air flow direction 18 from the air inlet 14 to the air outlet 16, and a condenser 20, through which the flow can pass bidirectionally, i.e. in two opposed air flow directions, for liquefying a refrigerant of the vehicle air conditioning unit, said condenser having an air flow cross section $A_1$ and being arranged adjacent to the air outlet 16 downstream of the fan 12. In this connection, it is explicitly pointed out that terms such as "downstream" and "upstream" within the context of this application always refer to the air flow direction 18.

In the present exemplary embodiment, the fan 12 comprises two axial ventilators and is driven by an electric motor, wherein the fan 12 provides a maximum static pressure difference of at most 300 Pa.

The air flow cross section $A_1$ of the condenser 20 has a first partial cross section 22, which is illustrated shaded, and, outside the shaded region, a second partial cross section 24 which is different from the first partial cross section 22, wherein the air outlet 16 of the fan 12 is assigned exclusively to the first partial cross section 22 and loads the latter in the air flow direction 18 with the entire air flow of the fan 12, wherein, during operation of the fan 12, a flow can pass through the second partial cross section 24 optionally in the air flow direction 18 of the fan 12 and counter to the air flow direction 18 of the fan 12.

The condenser 20 has a size $t_K$ in the air flow direction 18, where $t_K \leq 20$ mm, in particular 10 mm$\leq t_K \leq 16$ mm. It has turned out that a size of this order of magnitude constitutes a particularly good compromise between smallest possible flow resistance and greatest possible cooling power.

According to FIG. 1, the cooling module 10 of the vehicle air conditioning unit comprises a module frame 26, wherein both the fan 12 and the condenser 20 are accommodated in the module frame 26 and, together with the module frame 26, form a pre-assembled unit.

The module frame 26 is in particular a plastics injection molded part which can be produced at a reasonable cost and can be adapted with little outlay in terms of manufacturing to different boundary conditions.

The module frame 26 has projections 40 for mounting the cooling module 10 on the engine radiator 38 (also see FIGS. 2 to 4), wherein the projections 40 extend transversally with respect to the air flow direction 18.

Furthermore, the module frame 26 has a circular-cylindrical air duct 42 in which the fan 12 is fastened, wherein the air duct 42 defines the air inlet 14 and the air outlet 16 of the fan 12. In the present exemplary embodiment, the fan 12 is fastened by a fan ring 44 in the air duct 42 of the module frame 26 both in a form-fitting manner and by a screw connection (also see FIGS. 2 and 3).

Figure 2:
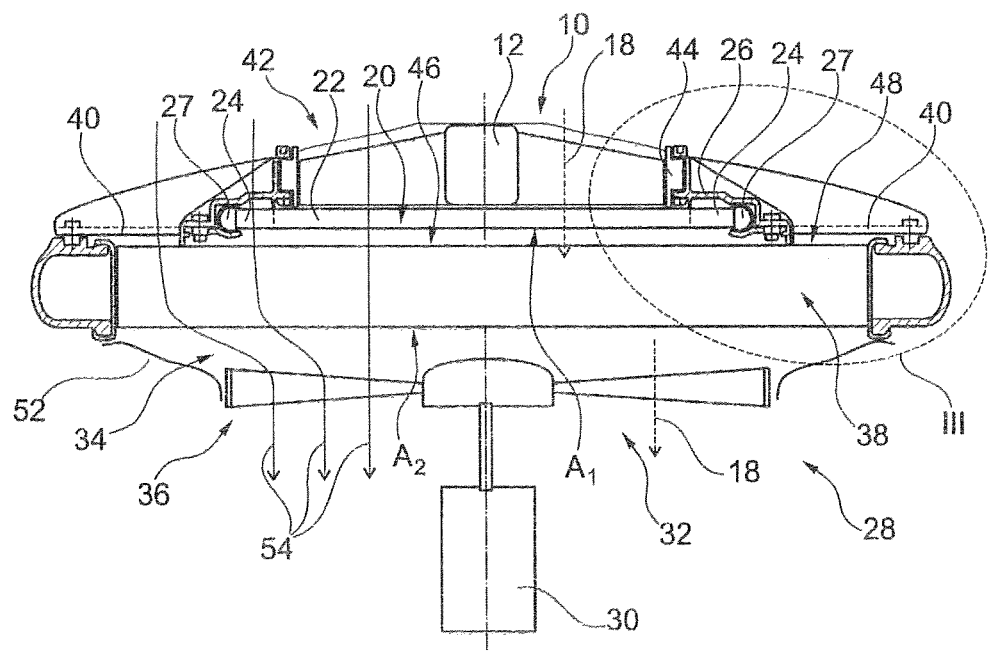
FIG. 2 shows a schematic sectional view of an assembly according to the invention for cooling a motor vehicle engine with a cooling module according to the invention of a vehicle air conditioning unit.
Figure 3:
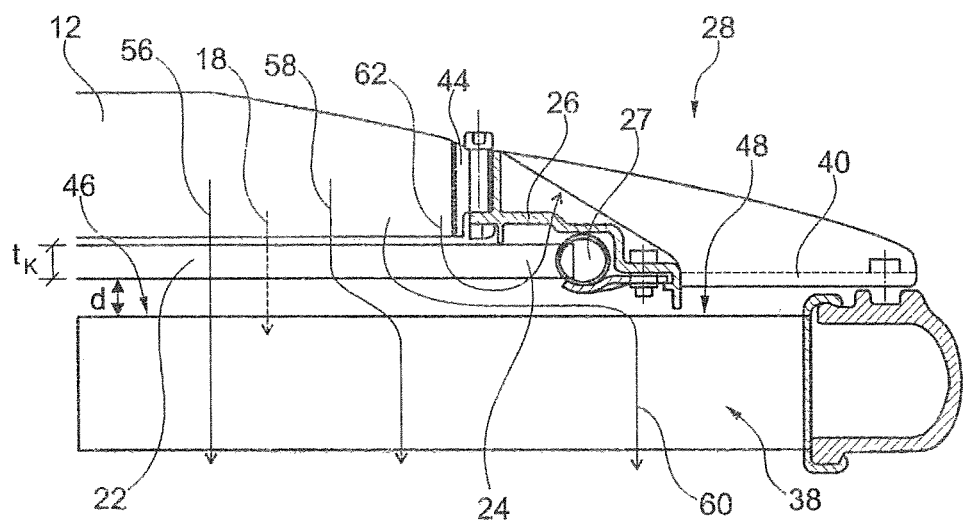
FIG. 3 shows a detail III of the assembly according to FIG. 2.

The condenser 20 has refrigerant collecting lines 27 via which said condenser is fixedly connected to the module frame 26, in particular is screwed or clamped thereto (also see FIGS. 2 and 3).

FIG. 2 shows an assembly 28 for cooling a motor vehicle engine 30, in particular a truck engine, with a radiator ventilator 32 which has a ventilator inlet 34 and a ventilator outlet 36 and generates an air flow in the air flow direction 18 from the ventilator inlet 34 to the ventilator outlet 36, and also an engine radiator 38, through which the air flow can pass, for cooling a coolant for the motor vehicle engine 30, said engine radiator having an air flow cross section $A_2$ and being arranged adjacent to the ventilator inlet 34 upstream of the radiator ventilator 32.

Furthermore, a mounting element 52 is provided which connects the radiator ventilator 32 to the engine radiator 38. In particular, the mounting element 52 surrounds the air flow cross section $A_2$ of the engine radiator 38 and tapers in a funnel-shaped manner toward the radiator ventilator 32, and therefore the radiator ventilator 32 loads the entire air flow cross section $A_2$ on the suction side.

According to FIG. 2, the radiator ventilator 32 is connected in terms of drive to the motor vehicle engine 30. Accordingly, the radiator ventilator 32 is driven in the driving mode (i.e. when the motor vehicle engine 30 is running) by the motor vehicle engine 30 and is deactivated in the parked state of the vehicle (i.e. when the motor vehicle engine 30 is switched off).

The assembly 28 for cooling a motor vehicle engine 30 also comprises the cooling module 10 which differs from the cooling module 10 according to FIG. 1 only in that the fan 12 according to FIG. 2 consists of only a single axial ventilator.

The condenser 20 of the cooling module 10 is arranged, according to FIG. 2, upstream of the engine radiator 38 and is directly adjacent to the engine radiator 38. An air flow in the driving mode, i.e. with activated radiator ventilator 32 and deactivated fan 12, is indicated via the arrows 54.

FIG. 3 shows the detail III of the assembly 28 for cooling the motor vehicle engine 30 according to FIG. 2. An air flow in the parked state of the vehicle with activated air conditioning unit, i.e. with activated fan 12 and deactivated radiator ventilator 32, is indicated here via the arrows 56, 58, 60 and 62.

The condenser 20 of the cooling module 10 has a distance d from the engine radiator 38 in the air flow direction 18, wherein the following applies: d>6 mm, in particular 8 mm$\leq d \leq 20$ mm. This distance d suffices in order to distribute the air flow, which is conveyed in the air flow direction 18 through the first partial cross section 22 of the condenser 20, downstream of the condenser 20 (arrow 60) and to permit a back flow counter to the air flow direction 18 via the second partial cross section 24 of the condenser 20 (arrow 62). The resultantly reduced flow resistance of the condenser 20 contributes to a particularly energy-efficient operation of the cooling module 10 when the motor vehicle engine 30 is switched off.

With a comparison of FIGS. 2 and 3, it becomes clear that the flow passes through the second partial cross section 24 of the air flow cross section $A_1$ of the condenser 20 in the air flow direction 18 in the driving mode of the vehicle according to FIG. 2 and counter to the air flow direction 18 in the parked state of the vehicle according to FIG. 3.

Figure 4:
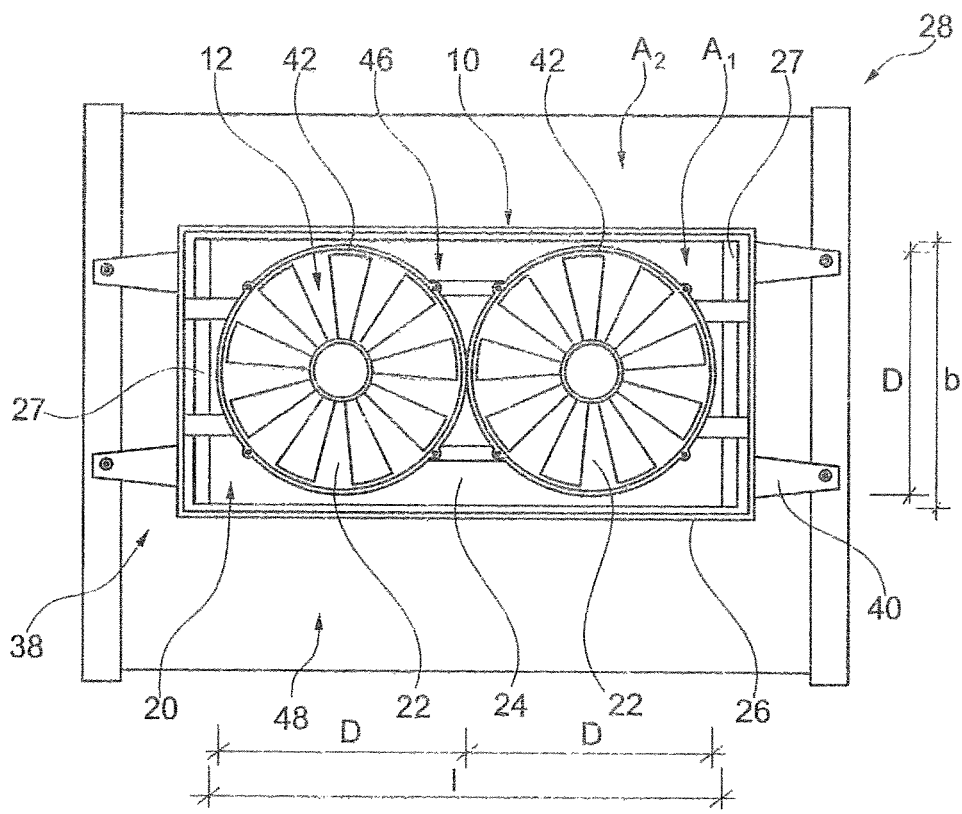
FIG. 4 shows a view of an assembly according to the invention for cooling a motor vehicle engine with the cooling module according to FIG. 1.

FIG. 4 shows a view of the assembly 28 for cooling the motor vehicle engine 30 in the air flow direction 18, with the cooling module 10 according to FIG. 1. It becomes clear with reference to this view that the condenser 20 has a rectangular air flow cross section $A_1$ with a length l and a width b and the fan 12 has two axial ventilators with a diameter D, wherein the following applies: $0.75 \leq D_b/b \leq 1$, in particular $0.85 \leq D_b/b \leq 0.95$. The value $D_b$ corresponds here to the sum of the diameters D of all of the axial ventilators of the fan 12 that are arranged next to one another in the direction of the width b of the condenser 20. In the present exemplary embodiment, the values $D_b$ and D are identical since only one axial ventilator is provided in the direction of the width b.

In addition, $0.75 \leq D_l/l \leq 1$, in particular $0.85 \leq D_l/l \leq 0.95$, also applies to the cooling module 10 according to FIG. 4. The value $D_l$ corresponds here to the sum of the diameters D of all of the axial ventilators of the fan 12 that are arranged next to one another in the direction of the length l of the condenser 20. In the present exemplary embodiment, the following applies: $D_l=2D$, since two axial ventilators are provided in the direction of the length l.

According to FIG. 4, the air flow cross section $A_2$ of the engine radiator 38 has a first partial cross section 46 and a second partial cross section 48 which is different from the first partial cross section 46, wherein the first partial cross section 46 is covered by the cooling module 10 and the second partial cross section 48 is freely adjacent to a radiator grille 50 (see FIG. 5) of the vehicle. The air flow cross section $A_2$ of the engine radiator 38 here is at least one and a half times as large, in particular at least twice as large, as the air flow cross section $A_1$ of the condenser 20.

If the air flow cross section $A_1$ of the condenser 20 is selected in such a manner that a satisfactory cooling power of the vehicle air conditioning unit arises both when the motor vehicle engine 30 is running and when the latter is switched off, a sufficient cooling of the motor vehicle engine 30 during the full load operation of the motor vehicle can also be ensured via the indicated ratio of sizes of the air flow cross sections $A_1$, $A_2$.

Figure 5:
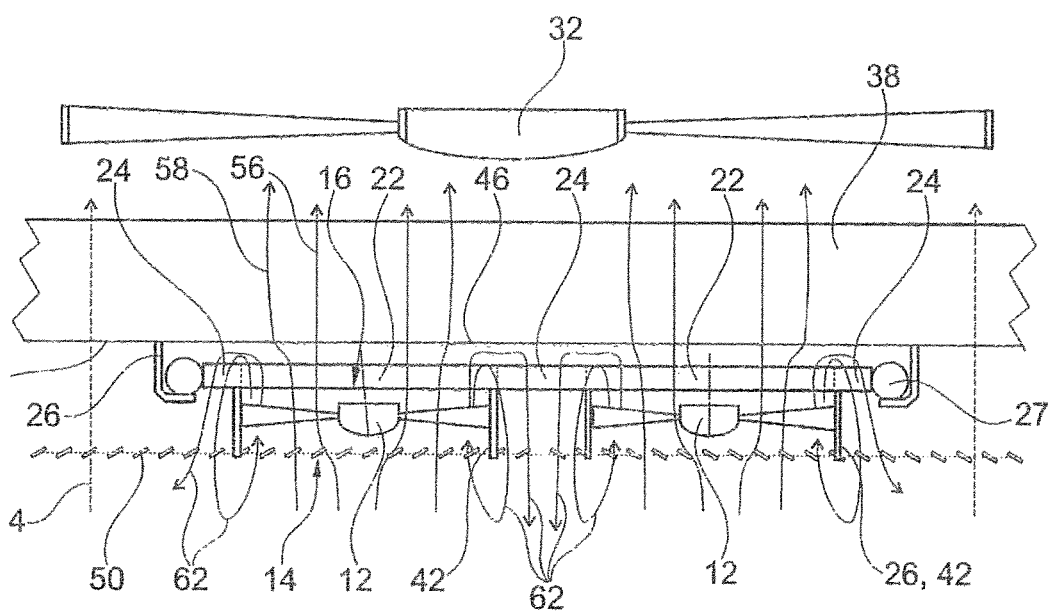
FIG. 5 shows a schematic detailed section through the assembly according to FIG. 4.

FIG. 5 shows a schematic section through the assembly 28 according to FIG. 4, wherein the radiator grille 50 of the vehicle is indicated upstream of the fan 12 with respect to the air flow direction 18. The air duct 42 here defines the air inlet 14 of the fan 12 and is adjacent in this region to the radiator grille 50 of the vehicle. In particular, the air duct 42 is tightly connected in the region of the air inlet 14 to the radiator grille 50.

In addition, the air duct 42 also defines the air outlet 16 of the fan 12 and is adjacent in this region to the condenser 20. In particular, the air duct 42 is tightly connected in the region of the air outlet 16 to the condenser 20.

The invention claimed is:

1. A cooling module of a vehicle air conditioning unit for trucks, comprising:
    a fan which has an air inlet and an air outlet and generates an air flow in an air flow direction from the air inlet to the air outlet; and
    a condenser, through which the air flow can pass bi-directionally, for liquefying a refrigerant of the vehicle air conditioning unit, said condenser having an air flow cross section and being arranged adjacent to the air outlet of the fan,
    wherein the air flow cross section has a first partial cross section and a second partial cross section which is different from the first partial cross section,
    wherein the air outlet of the fan is exclusively assigned to the first partial cross section and loads the first partial cross section in the air flow direction with the entire air flow of the fan, and
    wherein, during operation of the fan, the air flow can pass through the second partial cross section optionally in the air flow direction of the fan and counter to the air flow direction of the fan.

2. The cooling module as claimed in claim 1, wherein the fan is a fan driven by an electric motor.

3. The cooling module as claimed in claim 1, wherein the condenser has a size in the air flow direction, where 10 mm≤$t_K$≤16 mm.

4. The cooling module as claimed in claim 1, wherein the fan and the condenser are accommodated in a module frame and form a pre-assembled unit with the module frame.

5. The cooling module as claimed in claim 4, wherein the module frame has projections for mounting the cooling module on an engine radiator, wherein the projections extend transversally with respect to the air flow direction.

6. The cooling module as claimed in claim 4, wherein the module frame has an air duct in which the fan is fastened, wherein the air duct defines the air inlet and the air outlet of the fan.

7. The cooling module as claimed in claim 4, wherein the module frame is a plastics injection molded part.

8. The cooling module as claimed in claim 1, wherein the condenser has a substantially rectangular air flow cross section with a length and a width, and the fan has at least one axial ventilator with a diameter, wherein the following applies: 0.85≤$D_l$/l≤0.95, and/or 0.85≤$D_b$/b≤0.95, wherein $D_l$ and $D_b$ correspond to the sum of the diameters D of all of the axial ventilators of the fan which are arranged next to one another in the direction of the length or width of the condenser.

9. The cooling module as claimed in claim 1, characterized in that the air inlet of the fan is adjacent to a radiator grille of the vehicle, in particular is connected to the radiator grille.

10. The cooling module as claimed in claim 1, wherein the air outlet of the fan is adjacent to and connected to the condenser.

11. An assembly for cooling a motor vehicle engine, comprising:
    a radiator ventilator which has a ventilator inlet and a ventilator outlet and generates an air flow in an air flow direction from the ventilator inlet to the ventilator outlet; an engine radiator, through which the air flow can pass, for cooling a coolant for the motor vehicle engine, said engine radiator having an air flow cross section and being arranged adjacent to the ventilator inlet of the radiator ventilator; and
    a cooling module as claimed in claim 1, wherein the condenser of the cooling module is arranged upstream of the engine radiator and is adjacent thereto.

12. The assembly as claimed in claim 11, wherein the condenser of the cooling module has a distance from the engine radiator in the air flow direction, wherein the following applies: 8 mm≤d≤20 mm.

13. The assembly as claimed in claim 11, wherein a mounting element is provided which connects the radiator ventilator to the engine radiator.

14. The assembly as claimed in claim 11, wherein the air flow cross section of the engine radiator has a first partial cross section and a second partial cross section which is different from the first partial cross section, wherein the first partial cross section is covered by the cooling module and the second partial cross section is adjacent to a radiator grille of the vehicle.

15. The assembly as claimed in claim 11, wherein the air flow cross section of the engine radiator is at least twice as large as the air flow cross section of the condenser.

* * * * *